United States Patent [19]

DeLuca

[11] Patent Number: 5,075,684

[45] Date of Patent: Dec. 24, 1991

[54] SELECTIVE CALL MESSAGE MANAGEMENT

[75] Inventor: Michael J. DeLuca, Boca Raton, Fla.

[73] Assignee: Motorola, Inc., Schaumburg, Ill.

[21] Appl. No.: 418,055

[22] Filed: Oct. 6, 1989

[51] Int. Cl.[5] .............................................. H04Q 7/00

[52] U.S. Cl. .......................... 340/825.44; 340/825.26; 340/825.47

[58] Field of Search ........... 340/825.44, 311.1, 825.27, 340/825.26, 825.47; 369/25, 29; 379/56, 57, 88

[56] References Cited

U.S. PATENT DOCUMENTS

| | | | |
|---|---|---|---|
| 4,438,433 | 3/1984 | Smoot et al. | 340/825.44 |
| 4,518,961 | 5/1985 | Davis et al. | 179/2 EC |
| 4,649,538 | 3/1987 | DeLuca et al. | 371/25 |
| 4,688,034 | 8/1987 | De Graaf | 340/825.27 |
| 4,755,816 | 7/1988 | DeLuca | 340/825.44 |
| 4,786,901 | 11/1988 | Matai et al. | 340/825.44 |
| 4,851,829 | 7/1989 | DeLuca et al. | 340/825.44 |

*Primary Examiner*—Donald J. Yusko
*Assistant Examiner*—Peter S. Weissman
*Attorney, Agent, or Firm*—Daniel R. Collopy; Vincent B. Ingrassia; William E. Koch

[57] ABSTRACT

Messages received by a selective call receiver are stored in source files with a user allocated number of message storage slots in response to a message source signal indicating the source of the message. Messages are retrieved utilizing the source files facilitating message location in large memories. Source files are retrieved on a priority basis which is a function of a predetermined priority associated with each source file and the status of messages stored therein.

19 Claims, 5 Drawing Sheets

SELECTIVE CALL MESSAGE MANAGEMENT

FIELD OF THE INVENTION

This invention relates in general to selective call receivers, and in particular to memory management for selective call message storage.

BACKGROUND OF THE INVENTION

With the improvement in electronic components, the memory capacity of electronic devices such as selective call receivers has increased. Selective call receivers receive selective call messages and store the messages in message storage slots for review at a later time. The number of message storage slots is limited. As new messages arrive, old messages must necessarily be deleted to accomodate the new messages, for example in a first received, first deleted method. If the user wishes to review older messages, they may have been deleted. With improved memory capacity, selective call receivers can store more messages for review at a later time. However, as the number of stored messages increases, the ease of managing the messages so that the user can easily retrieve a specific message decreases.

One approach to handling messages by a selective call receiver was disclosed in U.S. Pat. No. 4,786,901, wherein a method for handling individual messages transmitted for and received by the selective call receiver and common messages transmitted for several selective call receivers and received by the selective call receiver is described. However, the method described does not allow the user to allocate the memory nor does it provide any means for managing a large number of stored individual messages.

Thus, what is needed is a method in a memory with a large capacity for storing messages that allows the user to allocate source files within the memory in a personalized manner and allows the user to easily retrieve a message when desired.

SUMMARY OF THE INVENTION

Accordingly, it is an object of the present invention to provide an improved method for storing and retrieving messages.

In carrying out the above and other objects of the invention in one form, there is provided a method for storing messages in source files with a user allocated number of message storage slots according to the source of the message.

DETAILED DESCRIPTION OF THE INVENTION

Figure 1:
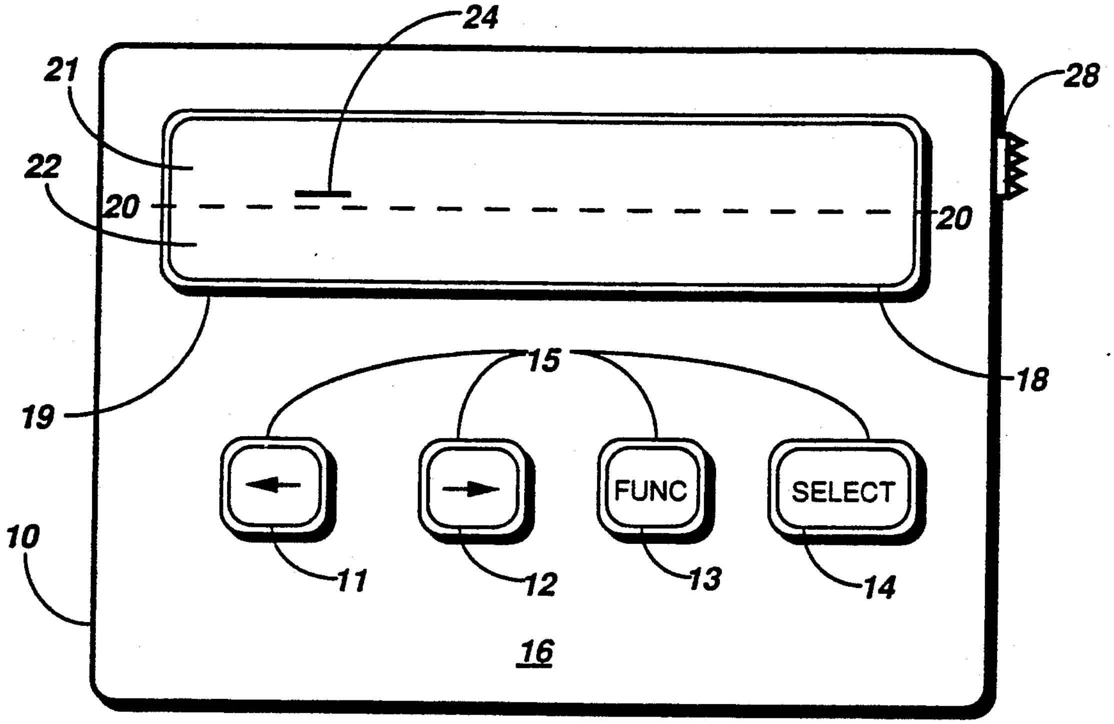
FIG. 1 is a top view of a selective call receiver according to the present invention.

Referring to FIG. 1, an electronic device comprising message storage means, such as a selective call receiver, comprises a housing 10 including openings 15 in a front plate 16 with user selectable control buttons 11, 12, 13, and 14 accessible therethrough. A display device 18 such as a liquid crystal display (LCD) divided into an upper display portion 21 and a lower display portion 22 at line 20—20 for a two line alphanumeric display is viewable through another opening 19 in the front plate 16. A cursor 24, on display 18 is moved one position to the left for each depression of the user selectable directional button 11. In a like manner, the cursor 24 is shifted one position to the right for each depression of the directional button 12. By depressing the user selectable button 13, a particular function will be performed based upon where the cursor 24 is located. The user selectable button 14 allows the user to select between the various source files when retrieving messages as described below. Alternatively, the operation of the select button 14 could be handled through manipulation of cursor 24 by means of directional buttons 11 and 12 to underscore a select icon on the display 18 and activation of function button 13. An on/off power switch 28 is mounted on the right hand side of the housing 10. Other user selectable controls could be added to the selective call receiver but are not essential to the operation of the present invention.

Figure 2:
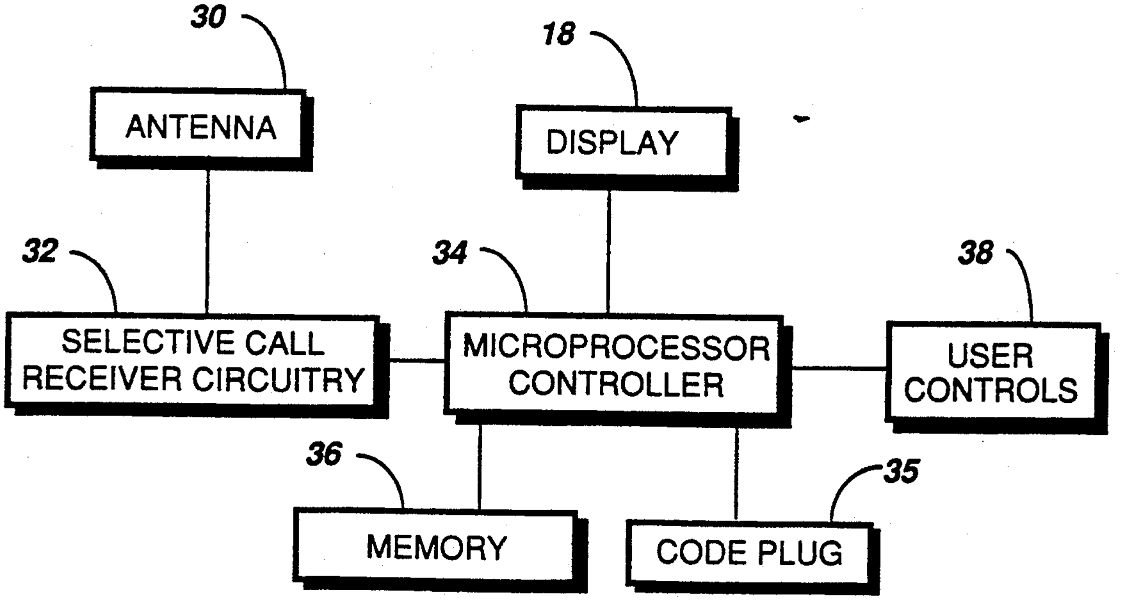
FIG. 2 is a block diagram of a selective call receiver according to the present invention.

Referring next to FIG. 2, a block diagram of the circuitry of the selective call receiver depicted in FIG. 1 comprises an antenna 30 for receiving signals coupled to a selective call receiver circuit 32 which demodulates the signals received. A microprocessor controller 34 is coupled to the receiver circuit 32 for processing the signals received. A memory 36 is coupled to the microprocessor controller 34 for storing those messages containing the address of the selective call receiver as determined by the microprocessor controller 34. The microprocessor controller 34 also controls the storing and recalling of those messages as explained below. A code plug 35 is coupled to the microprocessor 34 for providing a set of predetermined information, such as the address of the selective call receiver, to the microprocessor 34 in a manner well known in the art. The display device 18 visually displays a message and is controlled by the microprocessor controller 34. User controls 38 allow the user to command the microprocessor controller 34 to perform the selective call receiver operations well known to those skilled in the art and typically includes control switches such as the on/off control button 28, the cursor controls 11, 12, the function control 13, and the select control 14 (FIG. 1). For a more detailed description of the structure and operation of a selective call radio paging receiver of the type shown in FIG. 4, reference is made to U.S. Pat. No. 4,518,961, U.S. Pat. No. 4,649,538, and U.S. Pat. No. 4,755,816, all commonly assigned to the same assignee as the present invention, and the teachings of which are hereby incorporated by reference.

Figure 3:
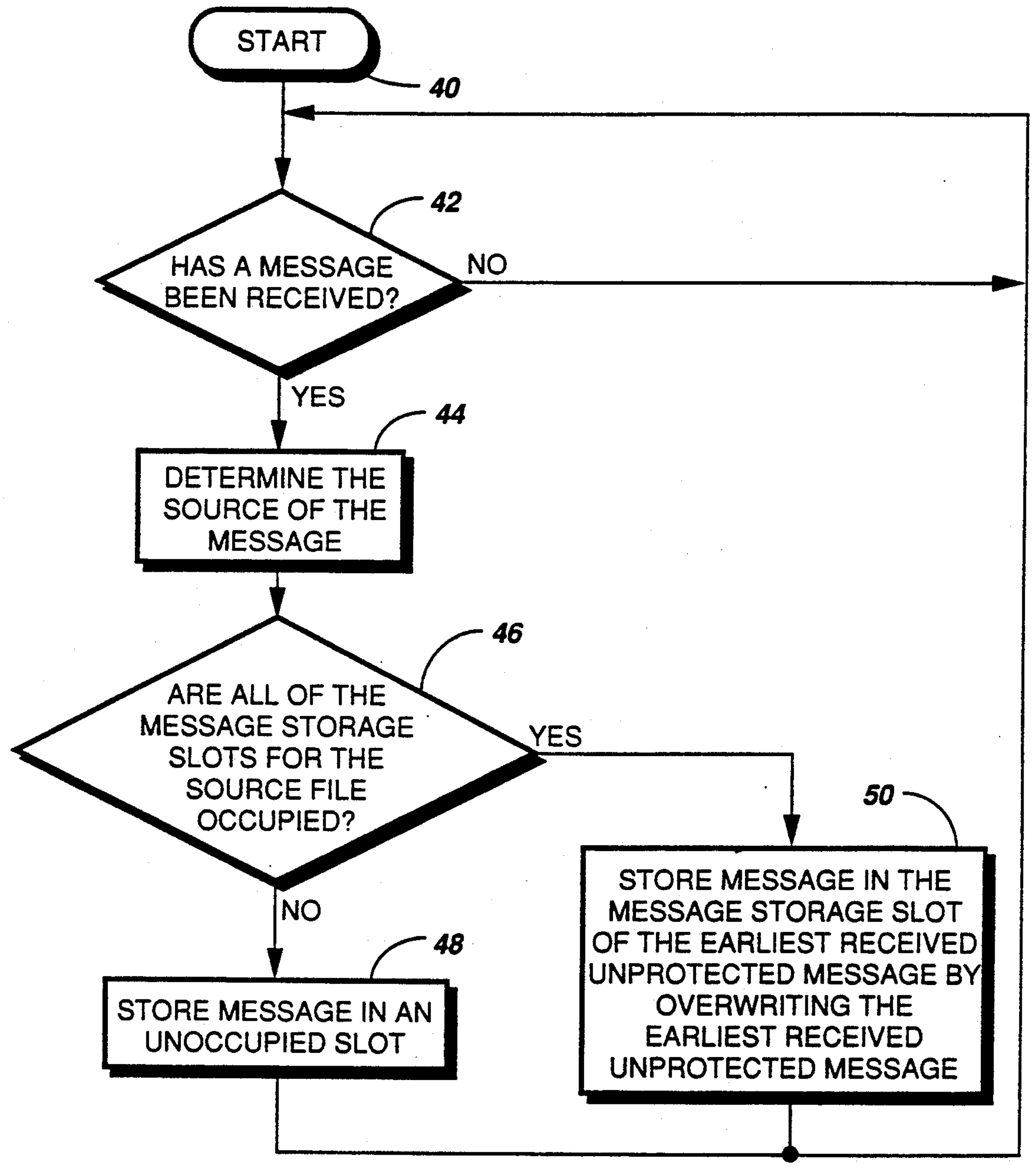
FIG. 3 is a flow chart of the operation of storing messages in a selective call receiver according to the present invention.

Referring next to FIG. 3, a flowchart of the operation of the microprocessor controller 34 in the message storage mode starts 40 by entering an idle loop awaiting the reception of a message to be stored. When a message has been received 42, the source of the message is determined 44 from a signal contained therein. The message source signal could be in the message address portion or a signal contained within the message itself. For each message source signal, there is a source file with an assigned number of message storage slots. The number of message storage slots assigned to each source file can be predetermined by information stored in the code plug 35 or can be varied by the user through manipulation of user controls 38 (FIG. 2).

If not all of the message storage slots assigned to the source file are occupied 46, the message is stored in one of the unoccupied slots 48. If all of the message storage slots assigned to the source file are occupied 46, the message is stored in the message storage slot occupied by the earliest received message which is unprotected 50, thereby overwriting and deleting the earliest stored unprotected message. Methods for storing a message with information indicating when the message was received by the selective call receiver and for protecting messages from being deleted in normal operation are well known in the art and are described in U.S. Pat. No. 4,851,829 assigned to the assignee of the present invention and the teachings of which are hereby incorporated by reference. After the message is stored, the message storage routine returns to the idle loop to await the reception of another message 42.

Figure 4A:
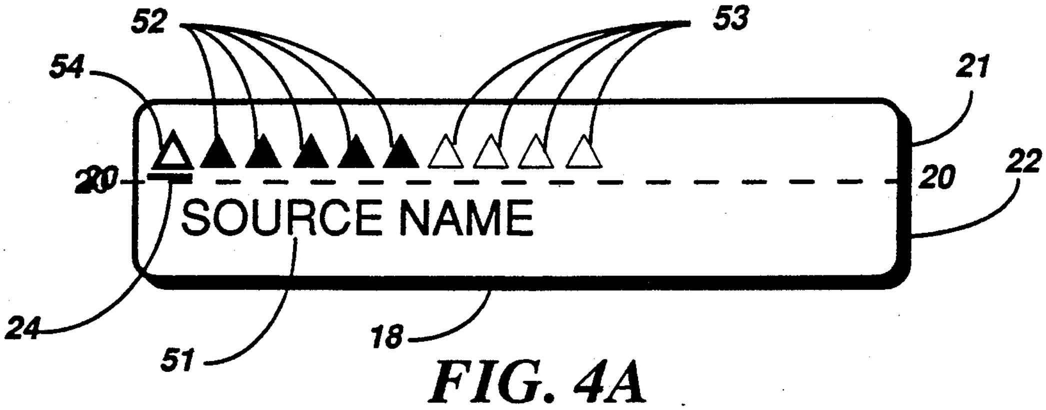
FIGS. 4A, 4B, 4C and 4D are views of alphanumeric display screens on a display of a selective call receiver according to the present invention.

Referring to FIGS. 4A, 4B, 4C and 4D, the display 18 is depicted displaying various source screens in the source select mode. Referring first to FIG. 4A, the line of the screen appearing in the lower portion 22 of the display 18 below line 20—20, comprises alphanumeric information 51 indicating the source file selected, for example SOURCE NAME. In the preferred embodiment, the SOURCE NAME indicates the message's originator or source file.

The line of the screen appearing in the upper portion 21 of the display 18 comprises a plurality of message storage slot indicators 52, 53 and 54. In the preferred embodiment, the message storage slot indicators are triangular geometric shapes. In another embodiment, the indicators could be any character, whether an alphanumeric character or a geometric shape, limited only by the constraints of the display. The message storage slot indicators advise the user whether a message storage slot is occupied or unoccupied and whether the message within the message storage slot has been read (i.e., displayed) or is unread. The filled triangular shapes 52 indicate that the message storage slots are occupied (i.e., have messages stored therein) and that the messages stored therein have been read. The open triangular shapes 53 indicate that the message storage slots are unoccupied (i.e., no messages have been stored therein or the messages stored therein have been deleted). The triangular shape 54 is flashing, as depicted by the thicker outline in FIG. 4A, indicating that the message within the message storage slot indicated by indicator 54 has not been read. The cursor 24 can be manipulated by the user as described above to allow the user to select a message to display.

Figure 4B:
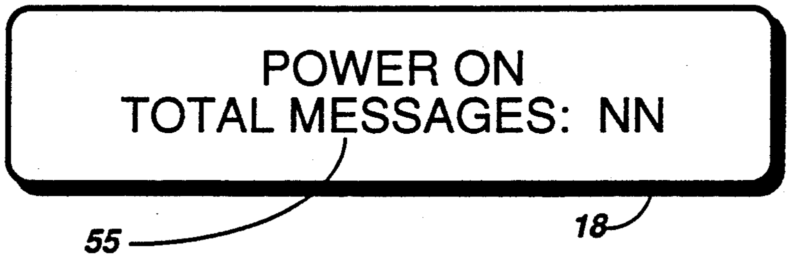

Referring next to FIG. 4B, the idle screen of the preferred invention 55 is shown. When the selective call receiver is initially powered on, the idle screen 55 is displayed on the display 18. The integer NN indicates the number of messages stored in all the message storage slots in the memory 36 (FIG. 2). After source selection and reading of messages, the idle screen 55 will be displayed as described below.

Figure 4C:
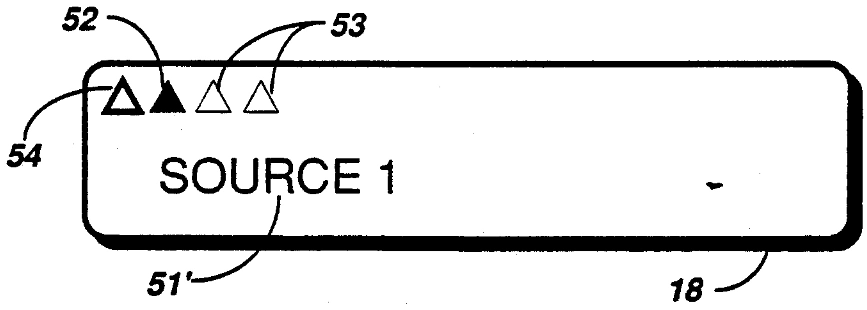

Referring to FIG. 4C, a source screen for a source file comprising four message storage slots 52, 53, 54, including one message storage slot with an unread message 54 is shown. The source file name 51' (SOURCE 1) could, for example, read WIFE and the user has alloted four message storage slots to messages received from his wife.

Figure 4D:
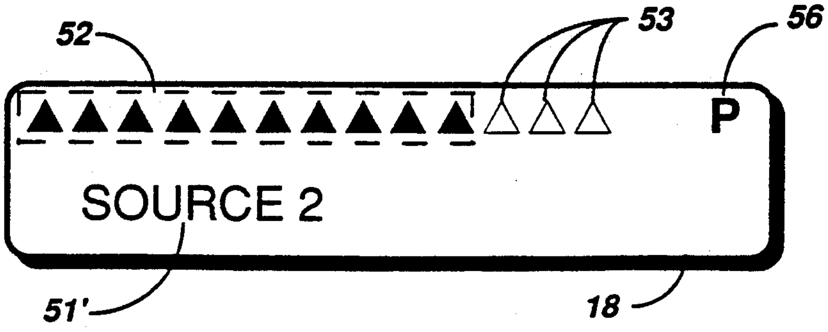

Referring to FIG. 4D, a source screen for a source file comprising thirteen message storage slots 52, 53, is shown. A "P" 56 in the upper right hand corner of the display 18 indicates that the source file has a priority. The priority of a source file can be user selected or predetermined by information in the code plug 35 (FIG. 2). The source file name 51' (SOURCE 2) could, for example, read EMPLOYER and the user has allotted thirteen message storage slots, ten of which are occupied (i.e., have messages stored therein), for messages received from the user's employer. The names corresponding to the source files, WIFE and EMPLOYER, for example, may be stored in the selective call receiver code plug 35 (FIG. 2), thereby providing individualization of source names for each selective call receiver.

Figure 5A:
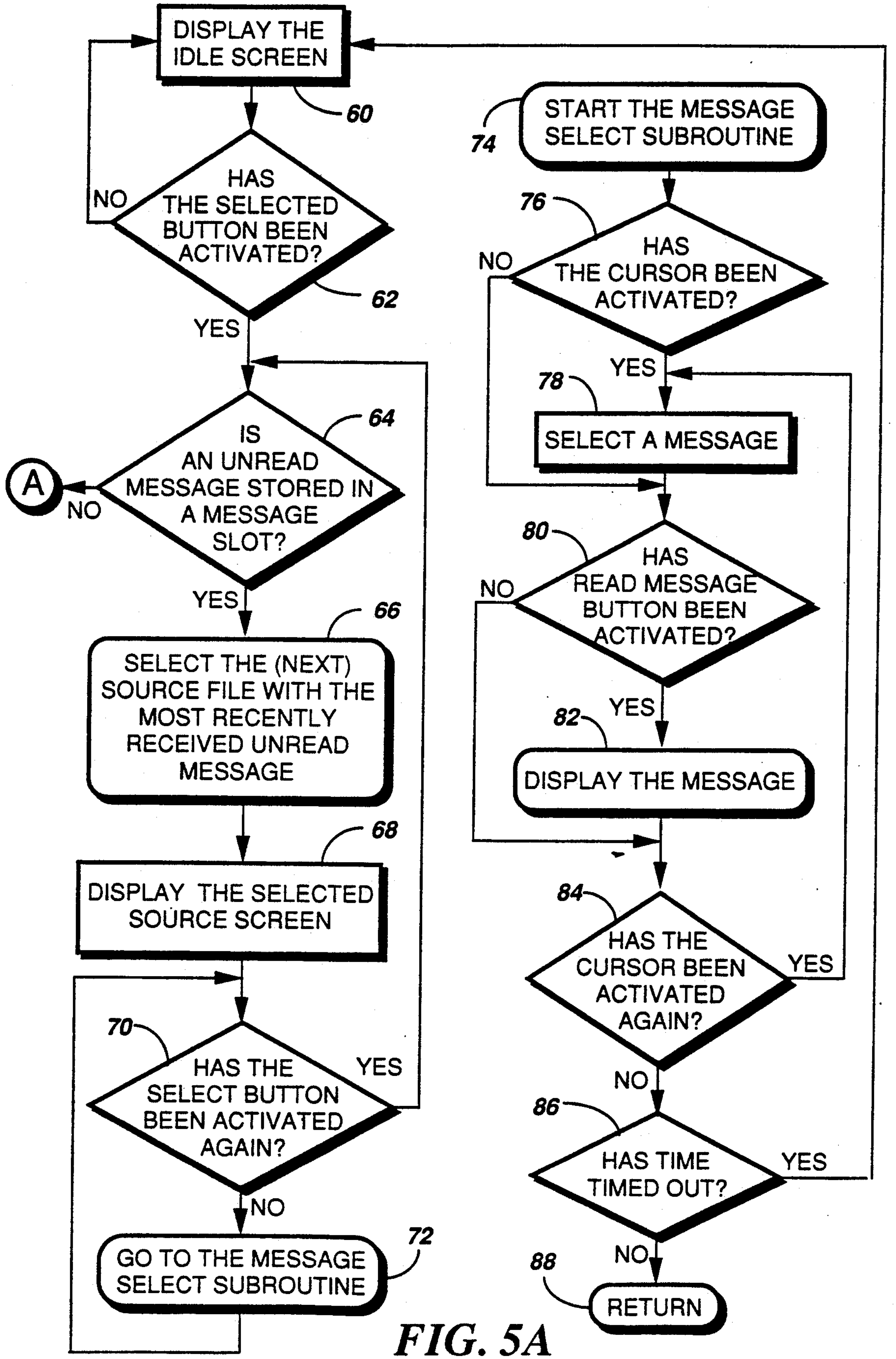
FIGS. 5A and 5B are a flowchart of the operation of retrieving messages in a selective call receiver according to the present invention.
Figure 5B:
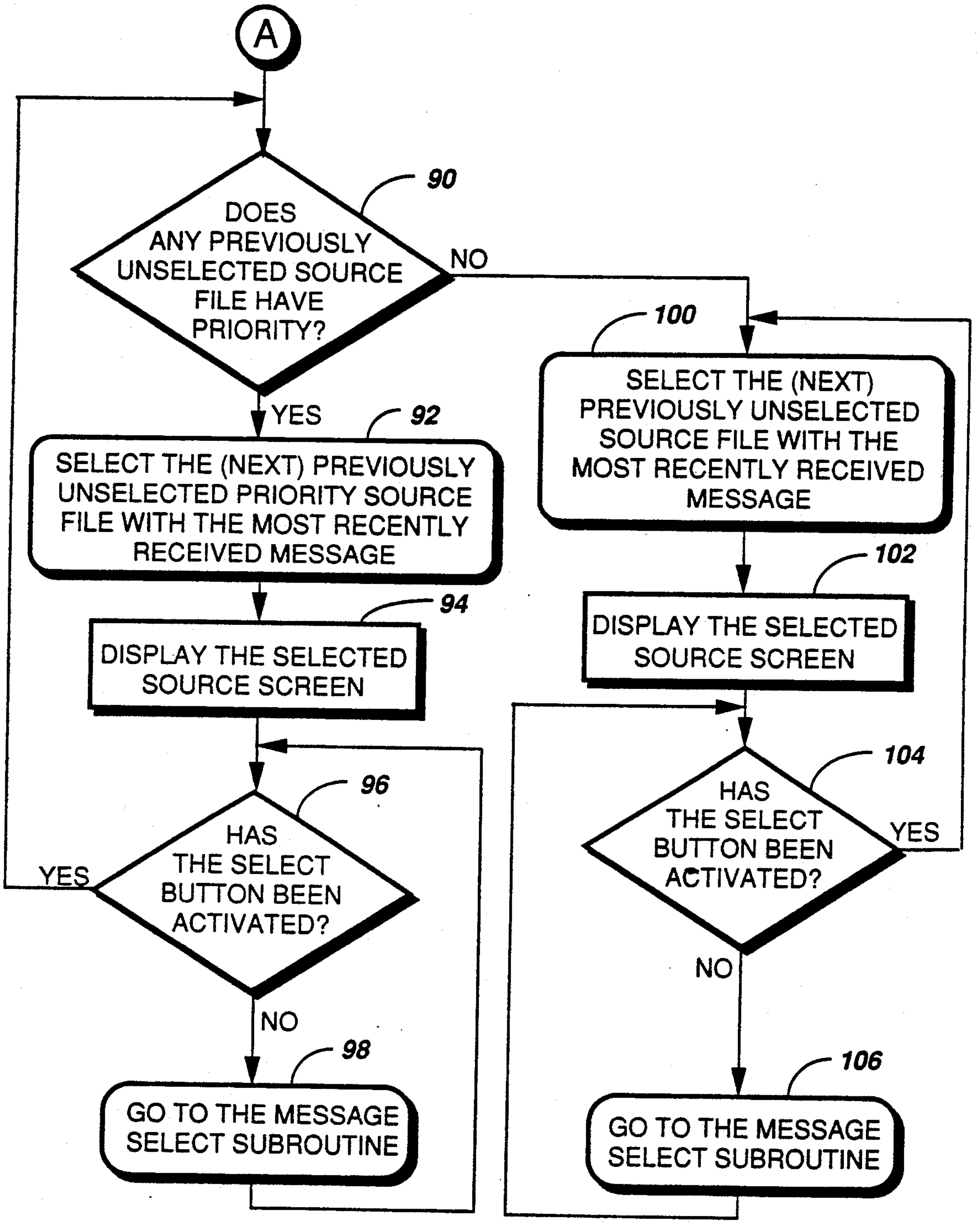

Referring to FIGS. 5A and 5B, a flowchart of a source select routine performed by the microprocessor 34 in response to successive activations of the select button 14 (FIG. 1), begins by displaying the idle screen 60. The idle screen, depicted in FIG. 4B, is displayed when the selective call receiver is powered on and remains displayed until the select button 14 (FIG. 1) has been activated, e.g., pressed, 62. When the select button is activated 62, the routine searches through the message slots to see if a message source file has a message slot with the most recently received or newest message that has not been read 64. Once found, the source file with the newest unread message is selected 66 and a source screen for the source file is displayed 68, as shown in FIG. 4C. If the select button is activated again 70, the routine searches for the next source file with the newest unread message 64.

If the select button is not activated, the routine performs a message select subroutine 72 beginning at start block 74. If the cursor has been activated 76, e.g., moved by activation of directional buttons 11 and 12 (FIG. 1), the message indicated by the stopping point of the cursor is selected 78 and the subroutine awaits activation of the read message button 80. In the preferred embodiment, activation of the read message button is activation of the function button 13 (FIG. 1) when the cursor is positioned under a message storage slot indicator on a source screen. When the read message button is activated 80, the source screen on the display is replaced with an alphanumeric output of the message 82.

If the cursor is not activated 76, and the read message button is again activated 80, the message displayed 82 is a subsequent screen of the message indicated by the initial position of the cursor on the source screen. If the message read button is not activated 80, the message display step 82 is skipped and activation of the cursor is awaited 84. If the cursor has been activated again 84, the message indicated is selected 78 and the subroutine awaits activation of the read message button 80. If the cursor is not activated again, a time counter is examined to see if the predetermined time for message select has timed out 86. If the predetermined time has timed out 86, the idle screen is again displayed 60. If the predetermined time has not timed out 86, processing returns from the subroutine to the source select routine 88. Returning from the processing by the message select subroutine 72, select button activation is awaited 70 and processing continues as described above.

When the select button has been activated 62 and there are no unread messages stored in any message storage slots 64, the source files are examined to see if a priority has been placed upon an unselected source file 90. The user can put a priority classification on a source file to allow that source file to be displayed before non-priority source files. For example, a user may desire to review messages from their employer before messages from their wife. The user could place a priority on the employer source file to accomplish this desire. If there are no source files, previously unselected, with priority 90, the source files are examined to determine which previously unselected source file contains the most recently received message 100. In this manner, a three-step hierarchy for selecting sources in a predetermined order is established whereby source files with unread messages are selected first in the reverse order (last stored, first selected) in which the unread messages were received. Source files having a priority attached which have not been previously selected are selected next in the reverse order in which the most recently received messages in each priority source file was received. Finally, the remaining previously unselected source files are selected in the reverse order of which the newest received message in each source file was received.

If source files not having been selected as having unread messages 64, have priority 90, the priority source file with the most recently received message is selected 92. The source screen for that source file is displayed 94 as shown in FIG. 4D, and, if the select button has not been activated again 96, the message select routine is performed 98. Upon return from the message select subroutine, activation of the select button is again awaited 96. When the select button has been activated 96, the source files are examined to see if a previously unselected priority source file exists 90. In this manner, the priority source files are examined from the priority source file previously unselected with the most recently received message to that with the earliest stored message.

After all source files having unread messages have been selected and all priority source files have been selected, the previously unselected source file with the most recently received message is selected 100. The source screen for that source file is displayed 102. When the select button is activated 104, the previously unselected source file with the next most recently received message is selected 100. If the select button is not activated, the message select subroutine is performed 106 and, when processing by the subroutine is complete, subsequent activation of the select button is awaited 104.

I claim:

1. A method in a communication receiver for saving a message transmitted to the communication receiver individually, said message having transmitted therewith a message source signal indicating an originator of said message and the communication receiver having a plurality of source files, said method comprising the steps of:

receiving said message and said message source signal;

decoding the message source signal; and storing said message in one of said plurality of source files, said one of said plurality of source files determined by the message source signal.

2. The method of claim 1, each of said plurality of source files having at least one message storage slot for storing a message, wherein the step of storing said message comprises the step of storing said message in an unoccupied one of said at least one message storage slot.

3. The method of claim 1 each of said plurality of source files having at least one message storage slot for storing a message, wherein the step of storing said message comprises the step of storing said message in an earliest occupied message storage slot having information stored therein if there are no unoccupied message storage slots in said one of said plurality of source files, thereby overwriting said information stored therein.

4. The method of claim 3 wherein the step of storing said message comprises the step of storing said message in an earliest occupied unprotected message slot.

5. The method of claim 1 further comprising before the step of receiving said message, the steps of:

designating a source identification signal for each of said plurality of source files; and allocating to each of said plurality of source files, at least one message storage slot.

6. The method of claim 5 wherein the step of storing said message further comprises the step of storing said message in one of said plurality of source files having the source identification signal substantially equivalent to said message source signal.

7. The method of claim 6 wherein the step of storing said message comprises the step of storing said message in an unoccupied message storage slot of said at least one message storage slot.

8. The method of claim 6 wherein the step of storing said message comprises the step of storing said message in an earliest occupied message storage slot of said at least one message storage slot having information stored therein if there are no unoccupied message storage slots of said at least one message storage slot in said one of said plurality of source files, thereby overwriting said earliest occupied message storage slot.

9. The method of claim 8 wherein the step of storing said message comprises the step of storing said message in an earliest occupied unprotected message storage slot of said at least one message storage slot.

10. The method of claim 5 wherein the step of allocating at least one message storage slot to each of said plurality of source files comprises the step of allocating a user selectable number of message storage slots to each of said plurality of source files.

11. A message storage apparatus for storing information having an information originator indicator indicating an originator of said information, said information received by said message storage apparatus in conjunction with a destination address, said message storage apparatus comprising:

memory means comprising a plurality of source files; and control means for storing said information in a one of said plurality of source files in response to said information originator signal if said destination address corresponds to a predetermined address of said message storage apparatus.

12. The message storage apparatus of claim 11 wherein each of said source files within said memory means comprises a user selectable number of message storage slots.

13. The message storage apparatus of claim 11 wherein the control means includes a source file select means for sequentially selecting one of said plurality of source files in response to a priority associated with each of said source files.

14. The message storage apparatus of claim 13 further comprising a user selectable control coupled to the control means wherein successive activations of said user selectable control signals said source file select means to sequentially select one of said plurality of source files in the order:

(a) selecting source files having unread information stored in message storage slots therein in the reverse order of which the unread information was received;

(b) selecting source files having information stored in message storage slots therein and having a predetermined priority level in the reverse order of which the most recently received information stored in message storage slots therein was received; and (c) selecting the remaining source files in the reverse order of which the most recently received information stored within the message storage slots in the remaining source files was received.

15. The message storage apparatus of claim 14 wherein the predetermined priority level of each of said source files is user selectable.

16. A selective call receiver comprising:

receiving means for receiving selective call messages having selective call addresses and message source signals, said message source signals indicating the originator of said selective call messages;

storage means for storing at least one predetermined selective call address;

a plurality of source files, each source file comprising at least one message storage slot, for storing each of the selective call messages comprising selective call addresses substantially equivalent to one of said at least one predetermined selective call address;

display means for displaying the stored selective call messages; and control means comprising:

address correlation means for determining whether the selective call messages comprise selective call addresses substantially equivalent to one of said at least one predetermined selective call address;

storage control means for storing each of the selective call messages comprising said message source signals in one of said message storage slots of one of said plurality of source files, said one of said plurality of source files determined in response to said message source signals; and source file selection means for selecting one of said plurality of source files for displaying the selective call messages stored therein by said display means.

17. The selective call receiver of claim 16 wherein said at least one message storage slot comprises a user selectable number of message storage slots.

18. The selective call receiver of claim 16 wherein the source file selection means sequentially selects one of the plurality of source files in the order:

(a) selecting source files having unread messages stored therein in the reverse order of which the unread messages were received;

(b) selecting source files having messages stored therein and having a predetermined priority level in the reverse order of which the most recently received messages stored therein were received; and (c) selecting the remaining source files in the reverse order of which the most recently received messages stored within the remaining source files were received.

19. The selective call receiver of claim 18 wherein the predetermined priority level of each of said source files is user selectable.

* * * * *

US005075684C1

(12) EX PARTE REEXAMINATION CERTIFICATE (7327th)

United States Patent

(10) Number: US 5,075,684 C1
(45) Certificate Issued: Jan. 26, 2010

DeLuca

(54) SELECTIVE CALL MESSAGE MANAGEMENT

(75) Inventor: Michael J. DeLuca, Boca Raton, FL (US)

(73) Assignee: Motorola, Inc., Schaumburg, IL (US)

Reexamination Request:
No. 90/010,338, Nov. 11, 2008

Reexamination Certificate for:

| | |
|---|---|
| Patent No.: | **5,075,684** |
| Issued: | **Dec. 24, 1991** |
| Appl. No.: | **07/418,055** |
| Filed: | **Oct. 6, 1989** |

(51) Int. Cl.

| | |
|---|---|
| ***G08B 5/22*** | (2006.01) |
| ***H04L 12/18*** | (2006.01) |

(52) U.S. Cl. .................. 340/7.47; 340/7.56; 340/825.26

(58) Field of Classification Search ......................... None

See application file for complete search history.

(56) References Cited

U.S. PATENT DOCUMENTS

| | | | |
|---|---|---|---|
| 4,845,658 | A | 7/1989 | Gifford |
| 5,049,874 | A | 9/1991 | Ishida et al. |
| 5,241,305 | A | 8/1993 | Fascenda et al. |

OTHER PUBLICATIONS

David K. Gifford et al., An Architecture for Large Scale Information Systems, ACM Symposium on Operating Systems Principles, 1985. pp. 161–170.

Stephen Pollock, A Rule–Based Message Filtering System, ACM Transactions on Information Systems, Jul. 1988. pp. 232–254, vol. 6, No. 3.

*Primary Examiner*—Colin M Larose

(57) ABSTRACT

Messages received by a selective call receiver are stored in source files with a user allocated number of message storage slots in response to a message source signal indicating the source of the message. Messages are retrieved utilizing the source files facilitating message location in large memories. Source files are retrieved on a priority basis which is a function of a predetermined priority associated with each source file and the status of messages stored therein.

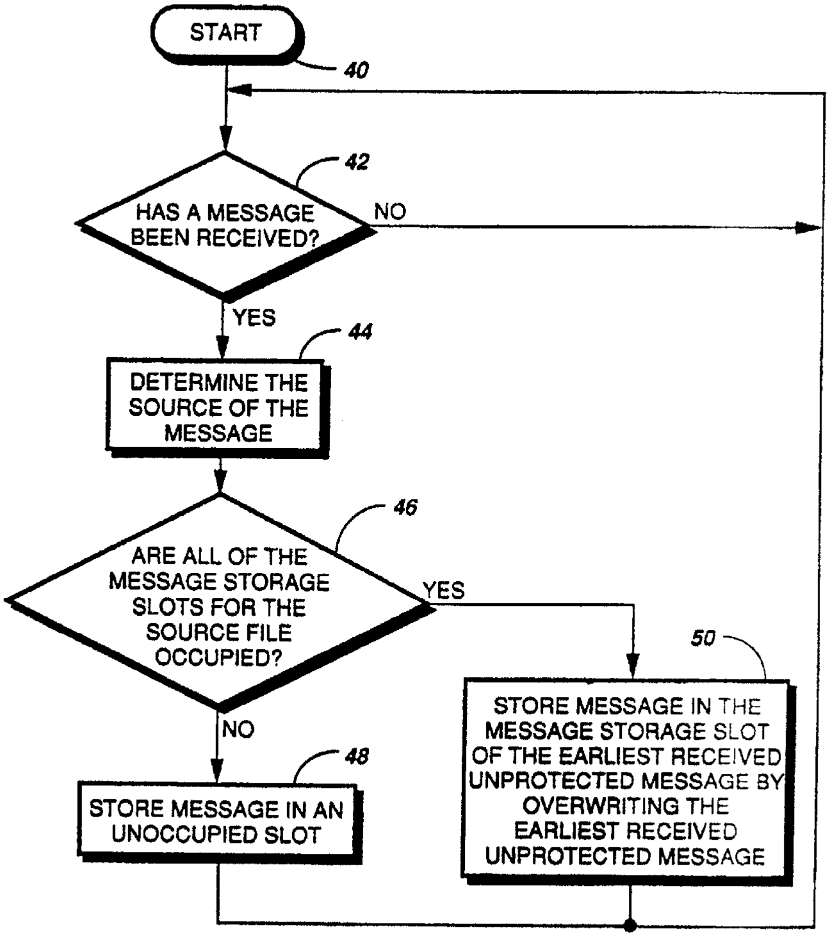

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *

US005075684C2

(12) EX PARTE REEXAMINATION CERTIFICATE (8112th)

United States Patent

DeLuca

(10) Number: US 5,075,684 C2

(45) Certificate Issued: Mar. 22, 2011

(54) SELECTIVE CALL MESSAGE MANAGEMENT

(75) Inventor: Michael J. DeLuca, Boca Raton, FL (US)

(73) Assignee: Motorola, Inc., Schaumburg, IL (US)

Reexamination Request:
No. 90/010,887, Apr. 9, 2010

Reexamination Certificate for:

| | |
|---|---|
| Patent No.: | **5,075,684** |
| Issued: | **Dec. 24, 1991** |
| Appl. No.: | **07/418,055** |
| Filed: | **Oct. 6, 1989** |

Reexamination Certificate C1 5,075,684 issued Jan. 26, 2010

(51) Int. Cl.
*G08B 5/22* (2006.01)

(52) U.S. Cl. .................. 340/7.47; 340/7.56; 340/825.26

(58) Field of Classification Search ........................ None
See application file for complete search history.

(56) References Cited

U.S. PATENT DOCUMENTS 4,988,991 A 1/1991 Motegi

OTHER PUBLICATIONS

Thomas W. Malone et al., "The Information Lens: An Intelligent System for Information Sharing in Organizations," Association for Computing Machinery CHI '86 proceedings, Apr. 1986.

Thomas W. Malone et al., "Intelligent Information–Sharing Systems," Communications of the ACM, May 1987, pp. 390–402, vol. 30, No. 5.

*Primary Examiner*—Christina Y Leung

(57) ABSTRACT

Messages received by a selective call receiver are stored in source files with a user allocated number of message storage slots in response to a message source signal indicating the source of the message. Messages are retrieved utilizing the source files facilitating message location in large memories. Source files are retrieved on a priority basis which is a function of a predetermined priority associated with each source file and the status of messages stored therein.

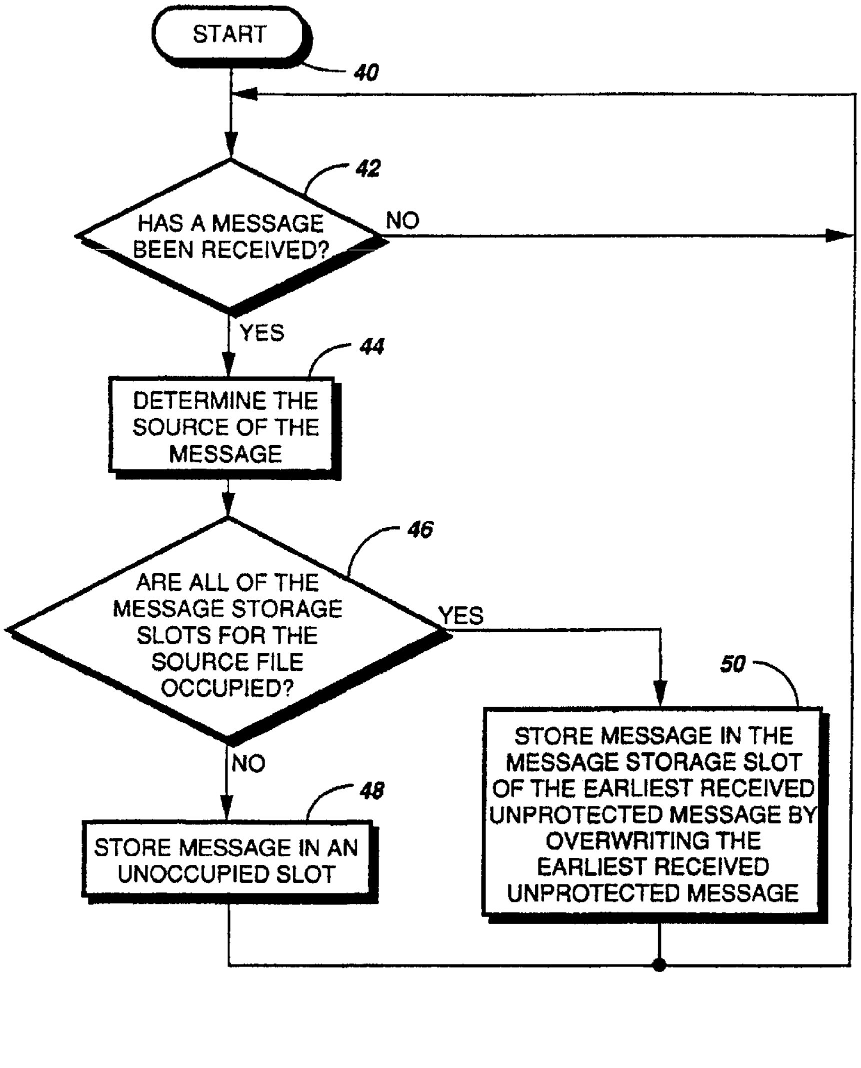

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3, 4, 8 and 9 is confirmed.

Claims 1, 2 and 5-7 are cancelled.

Claims 10-19 were not reexamined.

* * * * *